US009884477B2

(12) United States Patent
Yuno

(10) Patent No.: US 9,884,477 B2
(45) Date of Patent: Feb. 6, 2018

(54) PRINTING PLATE MANUFACTURING APPARATUS AND COMPUTER-READABLE NON-TRANSITORY RECORDING MEDIUM STORING A DATA GENERATING PROGRAM AND A CONTROL PROGRAM FOR A PRINTING PLATE MANUFACTURING APPARATUS

(71) Applicant: CASIO COMPUTER CO., LTD., Shibuya-ku, Tokyo (JP)

(72) Inventor: Hirotaka Yuno, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 800 days.

(21) Appl. No.: 14/501,646

(22) Filed: Sep. 30, 2014

(65) Prior Publication Data

US 2015/0100148 A1 Apr. 9, 2015

(30) Foreign Application Priority Data

Oct. 4, 2013 (JP) ................................ 2013-208687

(51) Int. Cl.
*G06F 19/00* (2011.01)
*B41C 1/055* (2006.01)

(52) U.S. Cl.
CPC .................................. *B41C 1/055* (2013.01)

(58) Field of Classification Search
None
See application file for complete search history.

(56) References Cited

U.S. PATENT DOCUMENTS 5,111,302 A * 5/1992 Chan .................. H04N 1/40087 347/15
5,355,303 A * 10/1994 Ferla .................... H04N 1/4055 347/238

(Continued)

FOREIGN PATENT DOCUMENTS

JP 04-358874 12/1992
JP 09-109535 4/1997

(Continued)

OTHER PUBLICATIONS

Office Action of Notification of Reasons for Rejection for Japanese Patent Application No. 2013-208687 dated Sep. 29, 2015, 5 pages.

*Primary Examiner* — Evral E Bodden
(74) *Attorney, Agent, or Firm* — Amin, Turocy & Watson LLP

(57) ABSTRACT a manufacturing of a printing plate from a thermoplastic porous material comprises a thermal head with a plurality of heater elements, acquire print data of a print pattern including pixel data, with each item of pixel data corresponding to each area of the surface of the porous material partitioned into a lattice shape; identify, print pixel data that is part of the print pattern, and non-print pixel data that is not comprising the print pattern; apply a first heat quantity to a first area corresponding to the non-print pixel data by at least one first heater element, that makes contact with the first area; apply a second heat quantity that is smaller than the first heat quantity to a second area by the second heater element that makes contact with the second area identified by the print pixel data, the second area being where ink readily runs.

15 Claims, 10 Drawing Sheets

(56) References Cited

U.S. PATENT DOCUMENTS

| | | | | |
|---|---|---|---|---|
| 5,946,450 | A * | 8/1999 | Ebner | G06K 15/02<br>358/1.2 |
| 6,163,329 | A * | 12/2000 | Venkataraman | B41C 1/055<br>101/327 |
| 6,718,871 | B1 * | 4/2004 | Fritz | G06K 15/02<br>101/171 |
| 6,767,073 | B2 * | 7/2004 | Tschida | B41J 2/155<br>347/13 |
| 6,972,781 | B2 * | 12/2005 | Tytgat | B41J 2/32<br>347/171 |
| 9,744,788 | B2 * | 8/2017 | Yuno | B41K 1/38 |
| 2005/0174620 | A1 * | 8/2005 | Woontner | B41M 5/38207<br>359/24 |
| 2006/0100737 | A1 * | 5/2006 | Pohlmann | G05B 19/4205<br>700/196 |
| 2015/0084256 | A1 * | 3/2015 | Yuno | B41K 3/00<br>269/86 |
| 2015/0084257 | A1 * | 3/2015 | Yuno | B41K 1/38<br>269/87 |

FOREIGN PATENT DOCUMENTS

| | | |
|---|---|---|
| JP | 09-314883 | 12/1997 |
| JP | 2002-137354 | 5/2002 |
| JP | 2005-280054 | 10/2005 |
| JP | 3716503 | 11/2005 |

* cited by examiner

PRINTING PLATE MANUFACTURING APPARATUS AND COMPUTER-READABLE NON-TRANSITORY RECORDING MEDIUM STORING A DATA GENERATING PROGRAM AND A CONTROL PROGRAM FOR A PRINTING PLATE MANUFACTURING APPARATUS

CROSS-REFERENCE TO RELATED APPLICATION

This application claims the benefit of Japanese Patent Application No. 2013-208687, filed on Oct. 4, 2013, the entire disclosure of which is incorporated by reference herein.

BACKGROUND OF THE INVENTION

Field of the Invention

This application relates generally to a printing plate manufacturing apparatus and to a computer-readable non-transitory recording medium storing a data generating program and a control program for a manufacturing apparatus.

Description of the Related Art

Technology (plate-manufacturing technology) for manufacturing a printing plate for imprinting text characters, graphics and/or the like on a medium such as paper and/or the like by selectively causing heater elements to generate heat while pressing the surface of a thermoplastic porous material with the heater elements has been known from before.

This technology uses the fact that the porous material melts in the area in contact with the high-temperature heater element, and pores formed in that area are plugged. By selectively causing the material to make contact with the heater element that is at a high temperature and forming in the porous material areas (the areas caused to make contact with the heater element that is at a high temperature) that do not absorb ink even when soaked in ink, a printing plate that prints desired characters and/or the like through ink transfer is manufactured.

However, with the above-described printing plate manufacturing method, areas of the porous material that did not make contact with the heater element that is at a high temperature are the areas that absorb the ink. When areas that absorb the ink exist in series, there are cases in which during ink transfer, ink is excessively supplied to the medium from those areas, so that the ink runs.

As technology related to this topic, in Japanese Patent No. 3716503, for example, technology is disclosed for forming a dot film layer in which the amount of permeation of ink into a porous substrate is uniformly controlled, by heating a dot form made of photosensitive resin or metal and pressing the print surface of a porous substrate with that dot form. In addition, in this Literature, technology is also disclosed for forming a dot film layer by a thermal head without using a die.

However, with the technology disclosed in the above-described Literature, a dot film layer is formed uniformly on the entire print surface, so the amount of permeation of the ink is limited even in areas with no fears of ink running. In addition, with the technology disclosed in the above-described Literature 1, dots (areas that do not absorb ink) determined in advance with no relation to the characters, graphics and/or the like printed (hereafter denoted as the print pattern) are formed on the print surface. Accordingly, it is impossible to manufacture a printing plate that prints the same pattern as the dots, so print patterns are limited.

BRIEF SUMMARY OF THE INVENTION

The computer readable non-transitory recording medium storing a control program for controlling a manufacturing apparatus which manufactures a printing plate from a thermoplastic porous material and comprises a thermal head with a plurality of heater elements according to the present disclosure is such that the control program causes a computer to:

acquire print data corresponding to a print pattern and including pixel data, with each item of pixel data corresponding to each area of the surface of the porous material partitioned into a lattice shape;

identify, based on the print data, print pixel data that is part of the pixel data and is pixel data comprising the print pattern, and non-print pixel data that is the other part of the pixel data and is pixel data not comprising the print pattern;

selectively apply a first heat quantity to a first area corresponding to the non-print pixel data by at least one first heater element, among the plurality of heater elements provided on the thermal head, that makes contact with the first area; and selectively apply a second heat quantity that is smaller than the first heat quantity to a second area by at least one second heater element, among the plurality of heater elements, that makes contact with the second area identified by the control data of the print pixel data, the second area being where ink readily runs.

The apparatus for manufacturing a printing plate from a thermoplastic porous material according to the present disclosure comprises:

a thermal head with a plurality of heater elements; and a controller for controlling the thermal head;

wherein the controller includes:

a data acquirer for acquiring print data corresponding to a print pattern and including pixel data, with each item of pixel data corresponding to each area of the surface of the porous material partitioned into a lattice shape;

a data identifier for identifying, based on the print data, print pixel data that is part of the pixel data and is pixel data comprising the print pattern, and non-print pixel data that is the other part of the pixel data and is pixel data not comprising the print pattern;

a first heat applier for selectively applying a first heat quantity to a first area corresponding to the non-print pixel data by at least one first heater element, among the plurality of heater elements, that makes contact with the first area; and a second heat applier for selectively applying a second heat quantity that is smaller than the first heat quantity to a second area by at least one second heater element, among the plurality of heater elements, that makes contact with the second area identified by the control data of the print pixel data, the second area being where ink readily runs.

The computer readable non-transitory recording medium storing a control program for generating control data for manufacturing a printing plate from a thermoplastic porous material according to the present disclosure is such that the control program causes a computer to:

acquire print data corresponding to a print pattern and including pixel data, with each item of pixel data corresponding to each area of the surface of the porous material partitioned into a lattice shape;

identify, based on the print data, print pixel data that is part of the pixel data and is pixel data comprising the print pattern, and non-print pixel data that is the other part of the pixel data and is pixel data no comprising the print pattern; and generate control data comprising the pixel data by determining for each targeted area corresponding to the print pixel data whether or not an area corresponding to the non-print pixel data exists in the neighborhood of the targeted area, and if not, identifying the targeted area as an area where the ink readily runs.

BRIEF DESCRIPTION OF THE DRAWINGS

A more complete understanding of this application can be obtained when the following detailed description is considered in conjunction with the following drawings, in which.

DETAILED DESCRIPTION

First Exemplary Embodiment

Figure 1:
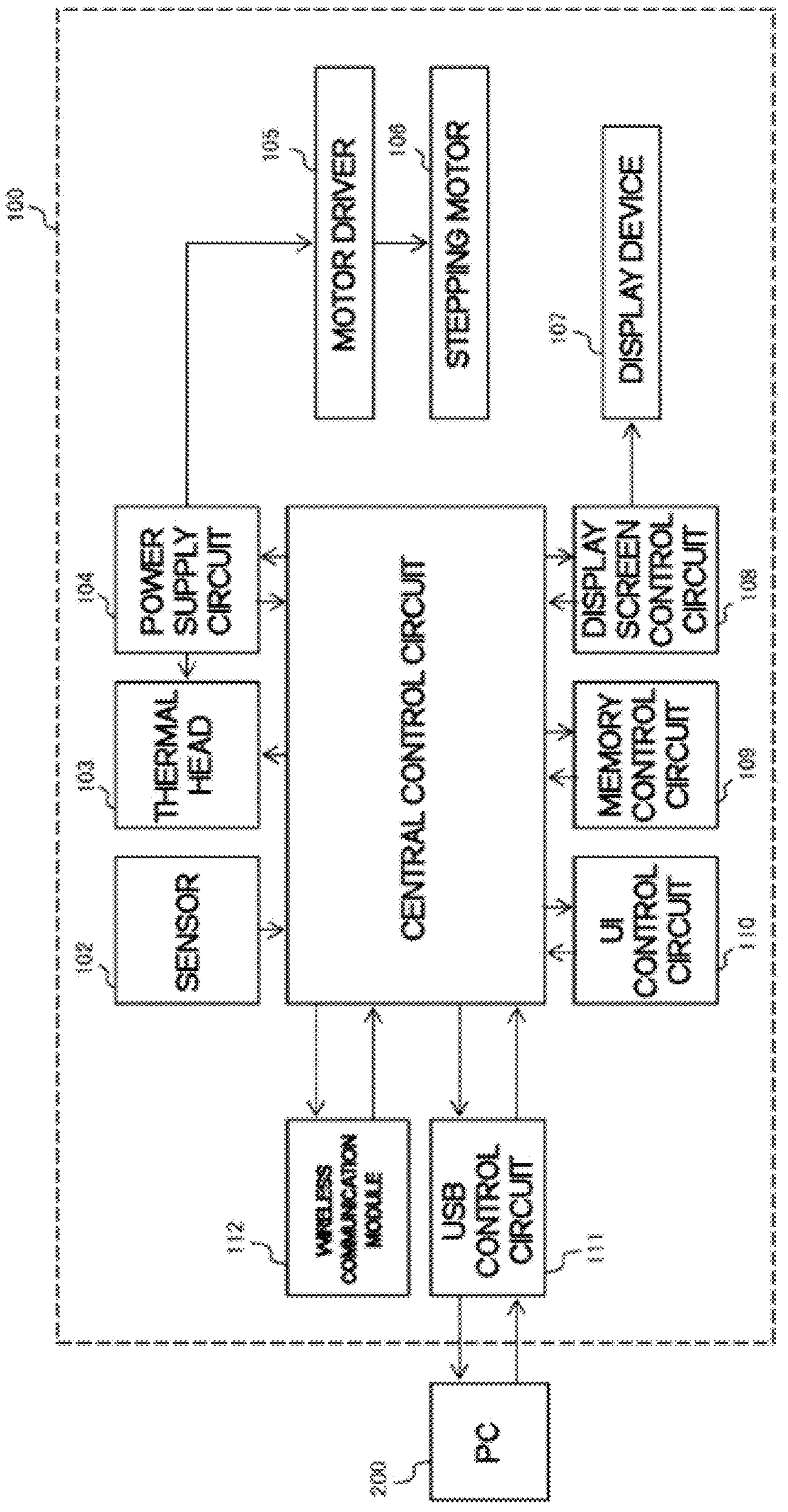
FIG. 1 is a drawing showing the structure of a thermal printer according to a first exemplary embodiment of the present disclosure.
Figure 2:
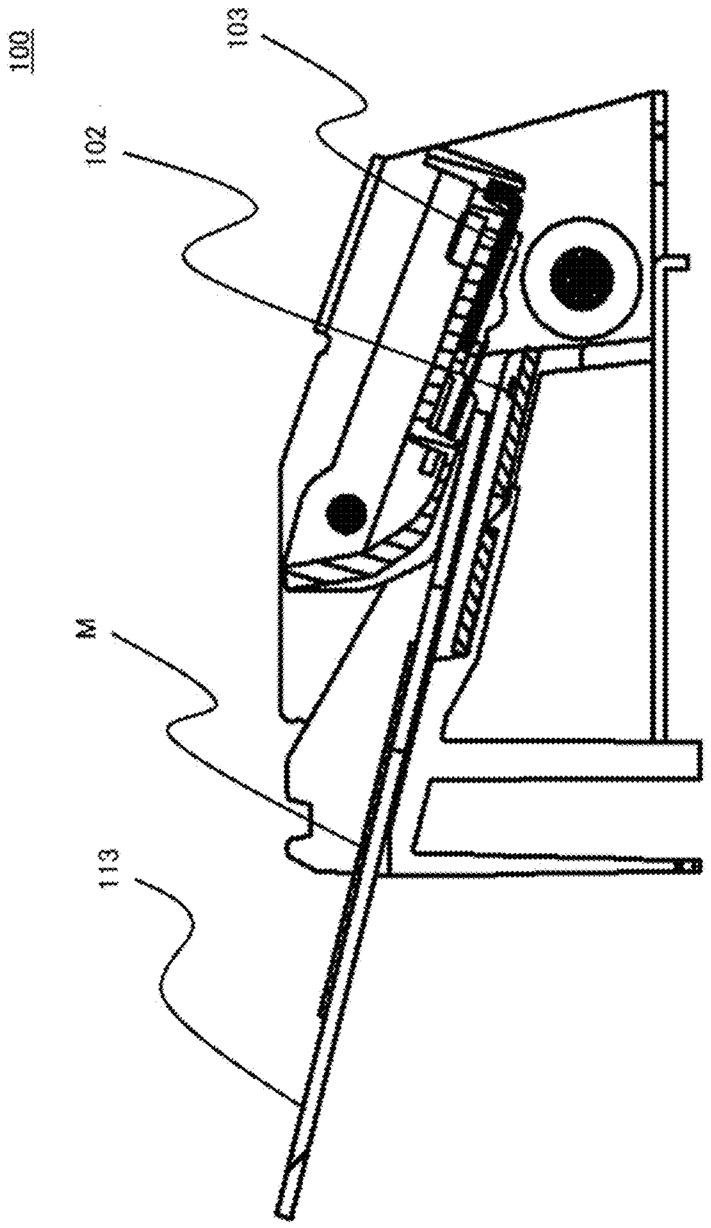
FIG. 2 is a cross-sectional view of the thermal printer according to the first exemplary embodiment of the present disclosure.
Figure 3:
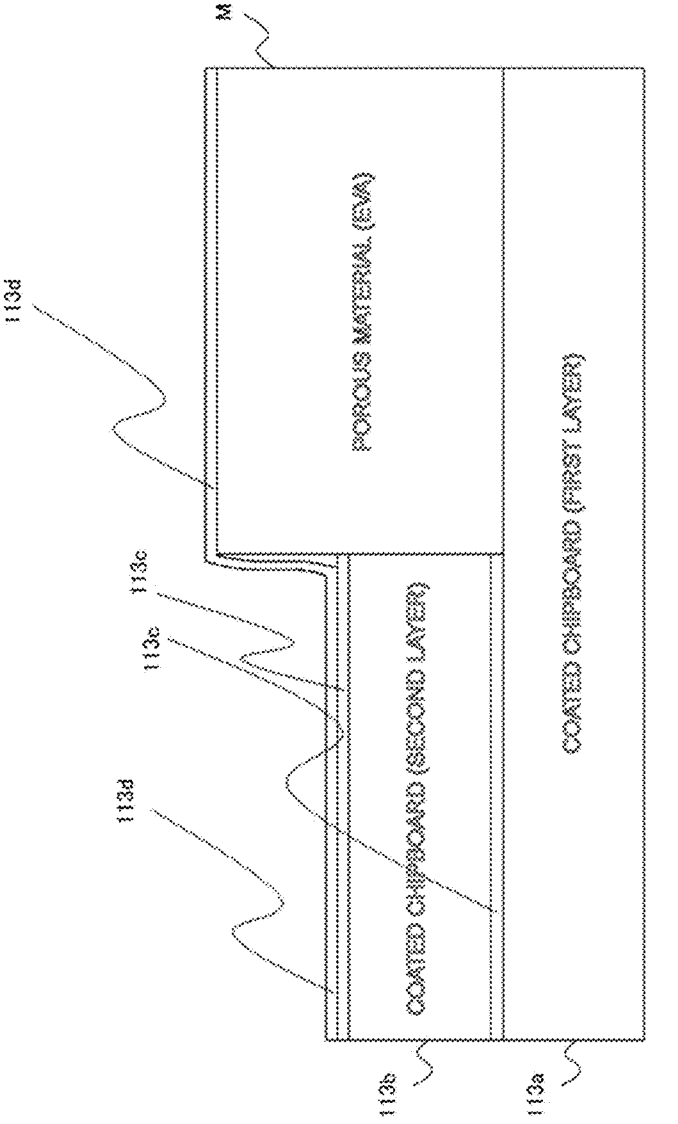
FIG. 3 is a cross-sectional view of a media holder for the thermal printer according to a first exemplary embodiment of the present disclosure.

FIG. 1 is a drawing showing the structure of a thermal printer 100 according to this exemplary embodiment. FIG. 2 is a cross-sectional view of the thermal printer 100 according to this exemplary embodiment. FIG. 3 is a cross-sectional view of a media holder 113 for the thermal printer 100 according to this exemplary embodiment. The thermal printer 100 shown in FIG. 1 and FIG. 2 is a manufacturing apparatus for manufacturing a printing plate for printing characters, graphics and/or the like on a medium such as paper and/or the like by transferring ink. With the thermal printer 100, a printing plate is manufactured from a thermoplastic porous material M. The thermoplastic porous material M used in manufacturing the printing plate is a material having innumerable pores made for example of ethylene vinyl acetate (EVA) copolymer, polyurethane and/or the like, although this is intended to be illustrative and not limiting.

First, the structure of the thermal printer 100 according to this exemplary embodiment will be described with reference to FIGS. 1 through 3.

As shown in FIG. 1, the thermal printer 100 comprises a central control circuit 101, a sensor 102, a thermal head 103, a power supply circuit 104, a motor driver 105, a stepping motor 106, a display device 107, a display screen control circuit 108, a memory control circuit 109, a user interface (UI) control circuit 110, a USB control circuit 111 and a wireless communication module 112.

The central control circuit 101 is a circuit for controlling various components (the thermal head 103, the memory control circuit 109 and/or the like) of the thermal printer 100. The central control circuit 101 comprises a CPU and/or the like that executes a control program stored in the memory control circuit 109.

The sensor 102 is a reflective optical sensor comprising a light-emitting element that emits light toward a prescribed direction, and a light-receiving element that receives reflected light reflected by an object. As shown in FIG. 2, the sensor 102 is composed so as to optically detect a cutout provided in the media holder 113 that supports the porous material M. The central control circuit 101 recognizes the size of the porous material M and the fact that the porous material M has moved to the start position for the platemaking process based on signals from the sensor 102. The media holder 113 comprises a two-layer structure of coated chipboard (coated chipboard 113*a*, coated chipboard 113*b*) adhered by double-faced tape 113*c*, for example as shown in FIG. 3. In the example of FIG. 3, the porous material M is supported by the top surface of the first layer coated chipboard 113*a* and the side surface of the second layer coated chipboard 113*b*, and furthermore, is supported in the media holder 113 by being covered by a PET film 113*d*.

The thermal head 103 comprises a plurality of heater elements for generating heat through the passing of electricity, each being independently controlled, and a driver IC for controlling the passing of electricity to the plurality of heater elements. In the thermal head 103, the driver IC causes the plurality of heater elements to selectively generate heat through electric power supplied from the power supply circuit 104, in accordance with print data and printing instruction signals output from the central control circuit 101. The plurality of heater elements are arranged linearly in the thermal head 103 in a direction orthogonal to the conveyance direction of the porous material M by the stepping motor 106 (in FIG. 3, a direction orthogonal to the surface of the paper), and are positioned so as to be capable of simultaneously coming into contact with the porous material M supported by the media holder 113. The thermal head 103 has, for example, a resolution of 200 dpi (0.125 mm per one dot) and has an effective printing width of 48 mm.

The power supply circuit 104 is a circuit for supplying electric power to the various components of the thermal printer 100, such as the thermal head 103, the motor driver 105 and/or the like.

The motor driver 105 is a driver for driving the stepping motor 106. The motor driver 105 drives the stepping motor 106 by supplying to the stepping motor 106 electric power supplied from the power supply circuit 104, in accordance with a driving signal (an excitation signal) output from the central control circuit 101.

The stepping motor 106 is a motor that rotates by only a fixed amount per single pulse of the driving signal output from the central control circuit 101, and is connected via gears to the conveyor mechanism that conveys the media holder 113 (the porous material M). The stepping motor 106 for example is driven by a 1-2 phrase excitation method and conveys the medial holder 113 0.0078 mm per step. Assuming one line to be 0.125 mm when platemaking with the porous material M, the stepping motor 106 conveys the media holder 113 (the porous material M) by the amount of a single line in 16 steps. With the thermal printer 100, it is possible for the central control circuit 101 to correctly understand the conveyance amount of the media holder 113 through the number of pulses of the driving signal output to the motor driver 105.

The display device 107 is a device for providing various information to a user by displaying screens under control of the display screen control circuit 108, and for example, is a liquid crystal display (LCD). The display screen control circuit 108 accomplishes control of data transfer to the display device 107 and of lighting the backlight of the display device 107.

The memory control circuit 109 includes a memory device such as a ROM, RAM and/or the like, and is a circuit for controlling reading and writing of data to the memory device. A control program is stored in the ROM of the memory control circuit 109.

The UI control circuit 110 accomplishes control of changing the screen display of the display device 107 in accordance with input into an input device such as an unrepresented keyboard, mouse, remote control, touch panel and/or the like. This control is accomplished by detecting a signal based on input to the input device, and controlling the display device 107 via the display screen control circuit 108 based on the information detected.

The USB control circuit 111 is a circuit for accomplishing sending and receiving of data via a USB cable with a personal computer (PC) 200 that is an external apparatus. The USB control circuit 111 receives print data for identifying the print pattern of characters, graphics and/or the like to be printed by the printing plate, from the PC 200, for example. In this case, the USB control circuit 111 is a data acquirer for acquiring print data.

The wireless communication module 112 is a circuit for accomplishing sending and receiving of data wirelessly with external apparatuses, and for example is a Bluetooth module or a wireless LAN (WLAN) module. The wireless communication module 112 for example receives print data from the PC 200. In this case, the wireless communication module 112 is a data acquirer for acquiring print data.

The thermal printer 100 comprised as described above executes the control program and generates control data identifying areas where ink easily runs based on the print data. Furthermore, by using the control data in heating control of the heater elements in the platemaking process along with the print data, it is possible to manufacture printing plates that can accomplish good printing while suppressing running of the ink.

Figure 4:
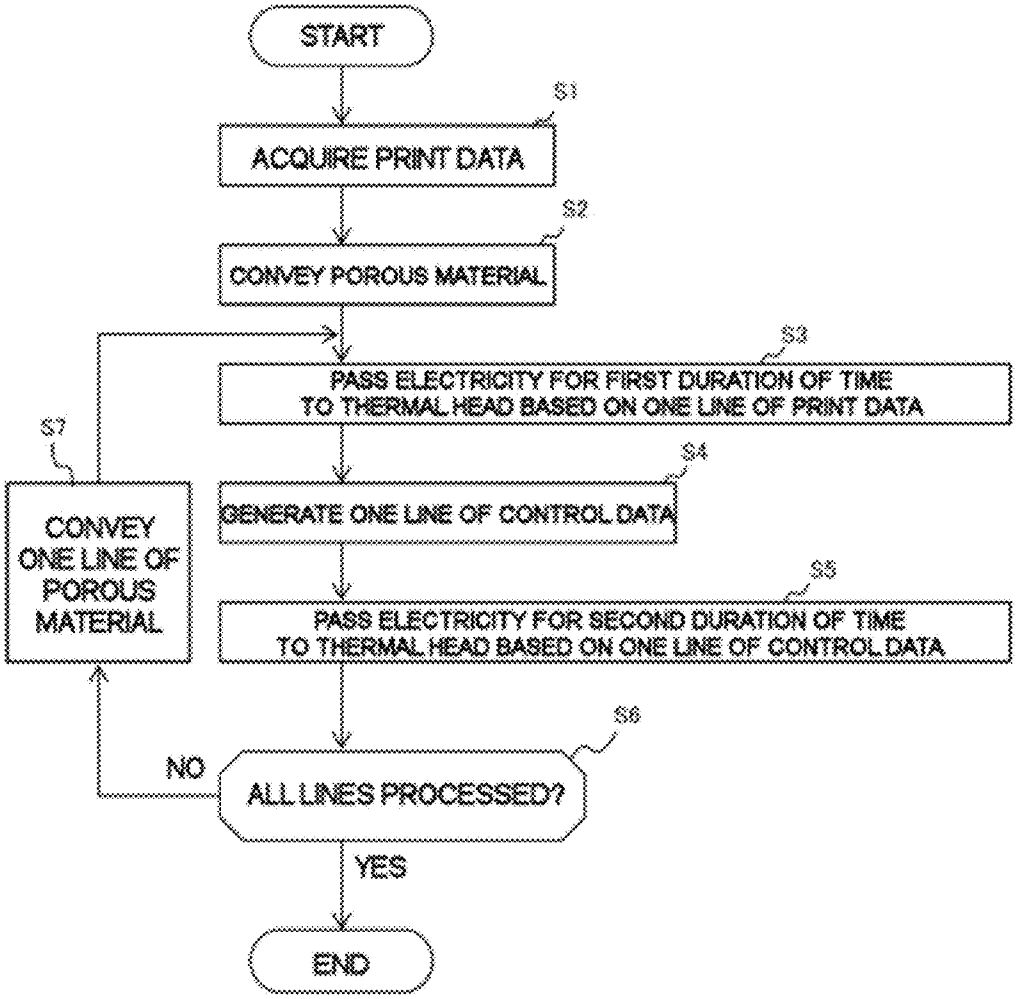
FIG. 4 is a flowchart for a platemaking process accomplished by the thermal printer according to the first exemplary embodiment of the present disclosure.
Figure 5:
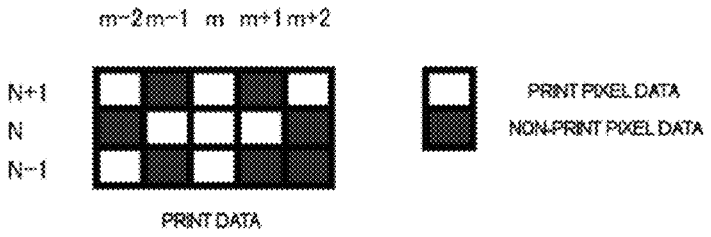
FIG. 5 is a drawing showing one example of print data acquired from an external apparatus by the thermal printer according to the first exemplary embodiment of the present disclosure.
Figure 6:
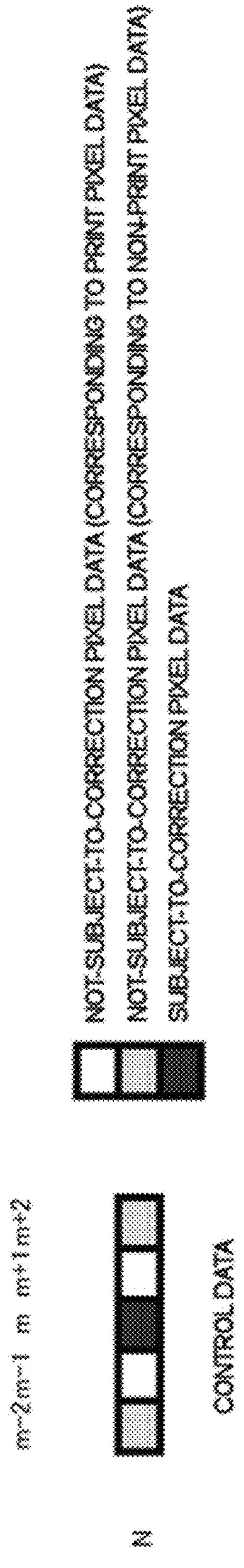
FIG. 6 is a drawing showing one example of control data generated based on the print data shown in FIG. 5 by the thermal printer according to the first exemplary embodiment of the present disclosure.

FIG. 4 is a flowchart of the platemaking process accomplished by the thermal printer 100. FIG. 5 is a drawing showing one example of print data acquired from the PC 200. FIG. 6 is a drawing showing one example of control data generated by the thermal printer 100. The platemaking process accomplished by the thermal printer 100 is described with reference to FIGS. 4-6.

The platemaking process shown in FIG. 4 is started by the central control circuit 101 loading into RAM and executing the control program stored in the ROM of the memory control circuit 109.

The thermal printer 100 first acquires from the PC 200 print data to identify a print pattern (step S1). The USB control circuit 111 or the wireless communication module 112 acquires the print data from the PC 200, and the acquired print data is stored by the central control circuit 101 in the RAM of the memory control device 109.

The print data is composed of pixel data corresponding to each area of the surface of the porous material M being printed, partitioned into a lattice shape. In this exemplary embodiment, the pixel data comprising the print data is one bit of data. Pixel data with a pixel value of "0" (white pixel data in FIG. 5) indicates pixel data comprising the print pattern (hereafter denoted as print pixel data), and pixel data having a pixel value of "1" (black pixel data in FIG. 5) indicates pixel data not comprising the print pattern (hereafter denoted non-print pixel data). For example, if the print pattern is the character "A", the pixel data corresponding to areas of the porous material M comprising "A" is the print pixel data, and pixel data corresponding to areas of the porous material M other than those is the non-print pixel data.

The thermal printer 100 that has acquired the print data conveys the porous material M to the start position of the platemaking process (step S2). The central control circuit 101 outputs a driving signal to the motor driver 105 until the porous material M has reached the start position based on a signal from the sensor 102, and the motor driver 105 drives the stepping motor 106 in accordance with the driving signal output from the central control circuit 101. The start position of the platemaking process is a position at which the first line of the various areas of the surface of the porous material M partitioned into a lattice shape makes contact with the plurality of heater elements, when the porous material M is pressed by the thermal head 103.

When the porous material M reaches the starting position, the thermal printer 100 passes electricity for the first duration of time to the thermal head 103 based on print data for one line read from the memory control circuit 109 (step S3). The central control circuit 101 reads one line of print data from the memory control circuit 109 and outputs the one line of print data read to the driver IC of the thermal head 103 along with a printing instruction signal. The driver IC of the thermal head 103 that has received the printing instruction signal accomplishes the process of passing electricity for the first duration of time in accordance with the one line of print data received, and selective causes the plurality of heater elements to generate heat.

More specifically, the process is accomplished in the following sequence. First, print pixel data and non-print pixel data are identified from the one line of print data. Next, the heater elements (first heater elements) that are to contact that areas of the porous material M corresponding to the non-print pixel data when the porous material M is pressed by the thermal head 103 is identified. Finally, electricity is passed for the first duration of time to the first heater elements identified from among the plurality of heater elements of the thermal head 103, and the identified first heater elements are selectively caused to generate heat. This is because the areas of the porous material M corresponding to the non-print pixel data are areas in which the pores should be plugged so that ink is not absorbed, and are areas that are targets of heating.

In step S3, the thermal printer 100 passes electricity for the first duration of time to the porous material M by means of the thermal head 103. The first duration of time is a prescribed duration of time determined in advance, and for example may be a duration of time sufficient for completely plugging the pores formed in the areas of the porous material M in contact with the heater elements generating heat. The thermal head 103 is constantly in contact with the print surface of the porous material M that becomes the basis of the printing plate, and presses with a constant force against the print surface of the porous material M. Through this, the areas of the porous material M corresponding to the non-print pixel data in contact with the heater elements that are generating heat melt and the pores formed in those areas are plugged. On the other hand, the areas corresponding to the print pixel data in contact with the heater elements that are not generating heat do not melt, so the pores formed in those areas are maintained.

Next, the thermal printer 100 generates one line of control data for identifying areas of the porous material M where the ink readily runs (step S4). Here, the central control circuit 101 reads from the RAM the current line of print data and the previous and subsequent lines of print data, and generates the control data based on the print data read. That is to say, in the thermal printer 100, the central control circuit 101 functions as a data generator.

The control data, similar to the print data, is composed of pixel data corresponding to each area of the surface of the porous material M to be printed, partitioned into a lattice shape. In FIG. 6, one example of one line of control data is shown. In this exemplary embodiment, the pixel data comprising the control data is one bit of data. The pixel data with a pixel value of “1” (the black pixel data in FIG. 6) is pixel data corresponding to areas where the ink readily runs. The areas where the ink readily runs are areas where a heating process is accomplished that is a corrective process for preventing running, so hereafter the pixel data corresponding to those areas is denoted as subject-to-correction pixel data. On the other hand, the pixel data with a pixel value of “0” (the white or halftone dot mesh pixels in FIG. 6) is pixel data corresponding to areas other than this. These areas are areas where a corrective process for preventing running is unnecessary, so hereafter pixel data corresponding to these areas is denoted as not-subject-to-correction pixel data.

The areas in the print data corresponding to the non-print pixel data are not-subject-to-correction pixel data in the control data (halftone dot mesh pixels in FIG. 6). This is because the areas corresponding to the non-print pixel data are areas that are not heat-processed and do not absorb the ink, so the ink does not run. On the other hand, areas in the print data corresponding to the print pixel data include pixel data subject to data correction (the black pixel data in FIG. 6) or pixel data not subject to data correction (the white pixel data in FIG. 6) in the control data.

The sequence of generating control data is described in detail with reference to FIGS. 5 and 6, taking as an example a case in which the Nth line of control data is generated.

First, areas corresponding to the print pixel data are identified from the Nth line of print data. Here, an area (N, m−1), an area (N, m) and an area (N, m+1) shown in FIG. 5 are identified. An area (I, j) refers to an area in the jth column of the Ith line.

Next, for each area corresponding to the identified print pixel data, a determination is made as to whether or not areas corresponding to non-print pixel data exist in the neighborhood of that area, based on print data read from the RAM. In this exemplary embodiment, the neighborhood of an area means areas adjacent up, down, left or right, and for example, in the case of the area corresponding to the area (N, m) in FIG. 5, the areas respectively corresponding to the area (N, m−1), the area (N, m+1), the area (N−1, m) and the area (N+1, m) are areas in the neighborhood.

Furthermore, when it is determined that no areas corresponding to non-print pixel data exist in the neighborhood of that area, that area is identified as an area where ink readily runs. On the other hand, when it is determined that such neighboring areas exist, that area is identified as an area where ink does not readily run. Here, the area (N, m) is identified as an area where ink readily runs, and the area (N, m−1) and the area (N, m+1) are identified as areas where ink does not readily run.

Finally, one line of control data is generated with the pixel data of areas identified as areas where ink readily runs as subject-to-correction pixel data, and the pixel data of areas identified as areas where ink does not readily run and pixel data of areas corresponding to the non-print pixel data as the not-subject-to-correction pixel data. Through this, the Nth line of control data illustrated in FIG. 6 is generated.

The above-described control data generation process (step S4) can be easily accomplished through logical operation on the print data in this exemplary embodiment. Specifically, it is possible to generate the control data by finding the logical sum (OR) of the pixel data (print data) corresponding to the areas observed and all pixel data (print data) corresponding to the neighboring areas, and accomplishing a logical negation (NOT) of that result.

When one line of control data is generated, the thermal printer 100 passes electric current for a second duration of time to the thermal head 103 based on the generated one line of control data (step S5). Here, the central control circuit 101 outputs to the driver IC of the thermal head 103 the one line of control data along with the printing instruction signal. The driver IC of the thermal head 103 that has received the printing instruction signal accomplishes passing of electricity for the second duration of time in accordance with the one line of control data received, and selectively causes the plurality of heater elements to generate heat.

More specifically, the process is accomplished in the following sequence. First, from the one line of control data, the subject-to-correction pixel data and the not-subject-to-correction pixel data are identified. Next, the heater elements (second heater elements) that will contact the areas of the porous material M corresponding to the subject-to-correction pixel data when the porous material M is pressed by the thermal head 103 are identified. Finally, electricity is passed for only the second duration of time to the second heater elements identified from among the plurality of heater elements of the thermal head 103, and the second heater elements are selectively caused to generate heat. This is because the areas of the porous material M corresponding to the pixel data subject of correction are areas identified as where ink readily runs, and are areas where absorption of ink should be controlled by plugging a portion of the pores.

In step S5, the thermal printer 100 passes electricity for the second duration of time to the porous material M by means of the thermal head 103. The second duration of time is a prescribed time determined in advance and is a shorter time than the first duration of time, for example a time around 10% to 50% as long as the first duration of time. The thermal head 103 is constantly in contact with the print surface of the porous material M that is the basis of the printing plate, and presses with a constant force on the print surface of the porous material M. Through this, the areas of the porous material M corresponding to the subject-to-correction pixel data in contact with the heater elements that are generating heat melt and a portion of the pores formed in those areas are plugged. On the other hand, the areas of the porous material M corresponding to not-subject-to-correction pixel data that are in contact with heater elements not generating heat maintain their status without change.

Finally, the thermal printer 100 determines whether or not all lines have been processed (step S6). When the determination is that all lines have not been processed, the thermal printer 100 conveys one line of the porous material M (step S7) and repeats the processes from step S3 through step S6 until the determination is that all lines have been processed. When the determination is that all lines have been processed, the platemaking process shown in FIG. 4 concludes.

In the thermal printer 100, by accomplishing the platemaking process shown in FIG. 4, pores formed in areas not comprising the print pattern (areas of the non-print pixel data) are all plugged, and some pores formed in areas determined to be where ink will readily run out of the areas comprising the print pattern (areas of the print pixel data) are plugged. Through this, it is possible to reduce the amount of ink absorbed in areas where ink readily runs, so with the thermal printer 100 it is possible to manufacture a printing plate for accomplishing good printing while controlling ink running.

In addition, with the thermal printer 100, print data is used when identifying areas where the ink readily runs. Through this, only areas where the ink readily runs undergo heat treatment, so it is possible to prevent areas where the ink does not readily run from erroneously undergoing heat treatment. Consequently, with the thermal printer 100, it is possible to manufacture a printing plate for accomplishing good printing while controlling ink running.

Below, a variation on the thermal printer 100 is described.

Figure 7:
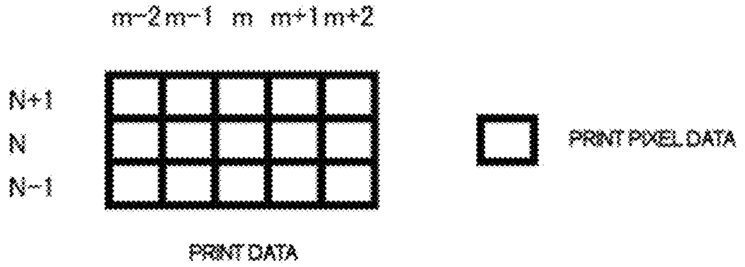
FIG. 7 is a drawing showing a different example of the print data acquired from an external apparatus by the thermal printer according to the first exemplary embodiment of the present disclosure.
Figure 8:
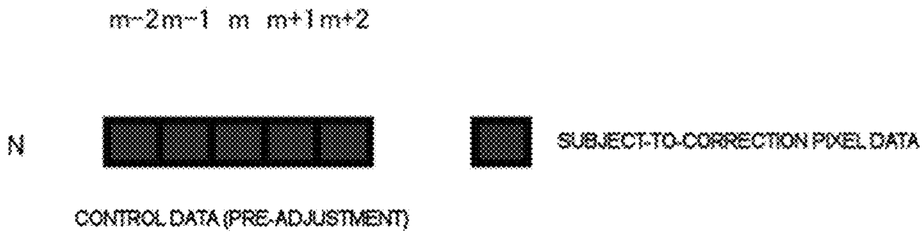
FIG. 8 is a drawing showing one example of pre-adjustment control data generated based on the print data shown in FIG. 7 by the thermal printer according to the first exemplary embodiment of the present disclosure.

For example, when the print data illustrated in FIG. 7 intended to manufacture a printing plate for total surface printing is received, if the thermal printer 100 generates control data in the sequence described above, control data comprised such that the entirety is subject-to-correction pixel data as illustrated in FIG. 8 is generated. When the heat treatment process is accomplished in accordance with this kind of control data, part of the pores in all areas of the porous material M are plugged. Consequently, there is a possibility that absorption of ink will be excessively limited for the printing plate as a whole.

Figure 9:
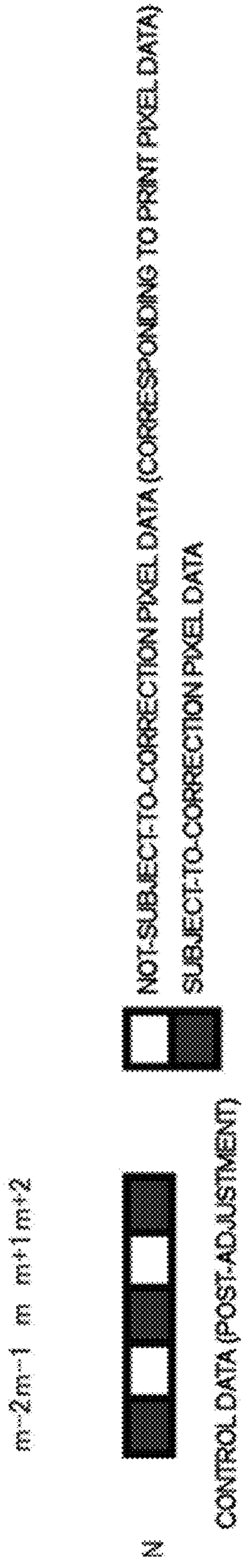
FIG. 9 is a drawing showing one example of post-adjustment control data generated based on the print data shown in FIG. 7 by the thermal printer according to the first exemplary embodiment of the present disclosure.

Consequently, in the control data generation process of step S4 shown in FIG. 4, the thermal printer 100 accomplishes a process of verifying the propriety of the generated control data, and when the control data is not proper, may accomplish a process of adjusting the control data. The propriety of the control data is, for example, determined based on whether or not subject-to-correction pixel data is adjacent within the control data. Furthermore, when the subject-to-correction pixel data is adjacent, a process of changing one item of subject-to-correction pixel data into an item of not-subject-to-correction pixel data is accomplished. Through this, even when the print data illustrated in FIG. 7 is received, the control data illustrated in FIG. 8 is adjusted and it is possible to obtain control data illustrated in FIG. 9.

Regarding which of the adjacent items of subject-to-correction pixel data becomes subject to adjustment, it would be fine to determine rules in advance, for example, the subject-to-correction pixel data in odd-numbered columns becomes subject to adjustment in the case of control data in odd-numbered lines (rows), and the subject-to-correction pixel data in even-numbered columns becomes subject to adjustment in the case of control data in even-numbered lines (rows).

With the thermal printer 100 that accomplishes the process of verifying the propriety of the control data, it is possible to prevent circumstances in which absorption of ink is excessively curtailed. Consequently, it is possible to manufacture a printing plate for accomplishing good printing while controlling ink running, regardless of the print pattern.

In addition, the platemaking process accomplished by the thermal printer 100 is not limited to that shown in FIG. 4. For example, it would be fine to generate all lines of control data after the print data acquisition process of step S1, and in this case, the process of step S4 may be omitted.

In addition, the thermal printer 100 may identify readily running areas through a process different from the above-described process, in the control data generation process of step S4. For example, it would be fine to identify readily running areas with reference to areas adjacent in an oblique direction in addition to areas adjacent up, down, left or right. In addition, in place of determining whether or not areas corresponding to the non-print pixel data exist, it would be fine to determine whether or not areas corresponding to the non-printing areas exist in greater than a constant percentage.

In addition, as long as the heat quantity that should be applied to each area is maintained, the thermal printer 100 may be such the number of times electricity is passed differs instead of the length of time of passing electricity differing in the process of passing electricity in steps S3 and S5, and for electricity to be passed for the same duration of time in each round. In addition, as long as the heat quantity that should be applied to each area is maintained, the thermal printer 100 may be such that the voltage value differs when passing electricity instead of causing the duration of time of passing electricity to differ in the process of passing electricity in step S3 and S5, and for the voltage values to be passed for the same duration of time. Furthermore, it would be fine for the thermal printer 100 to be such that the heat quantity that should be applied to each area is maintained by combining and controlling multiple out of the electricity passing duration of time, the electricity passing frequency and the voltage value, in the process of passing electricity in steps S3 and S5.

Second Exemplary Embodiment

Figure 10:
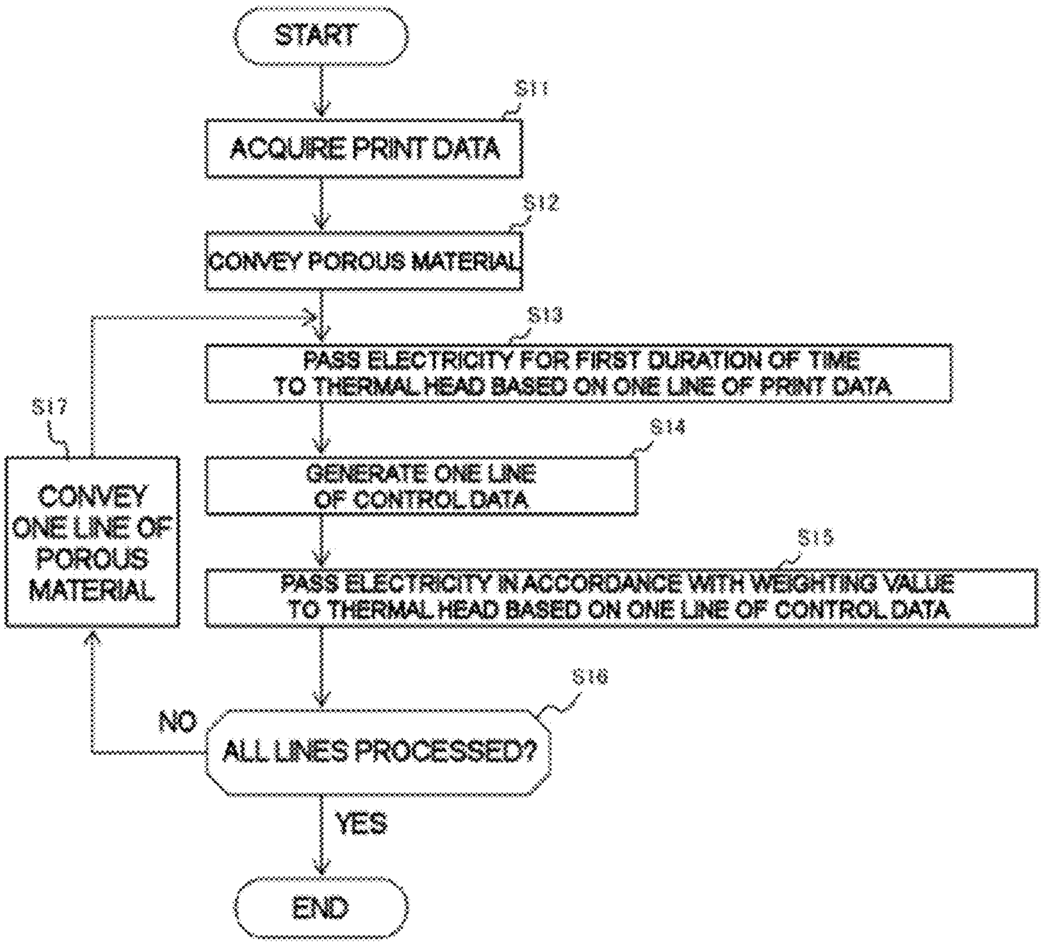
FIG. 10 is a flowchart of a platemaking process accomplished by a thermal printer according to a second exemplary embodiment of the present disclosure.

FIG. 10 is a flowchart for a platemaking process accomplished by a thermal printer according to this exemplary embodiment. Below, the platemaking process accomplished by the thermal printer according to this exemplary embodiment is described with reference to FIG. 10.

The structure of the thermal printer according to the exemplary embodiment is the same as that of the thermal printer 100 according to the first exemplary embodiment. Consequently, the same constituent elements are labeled with the same reference symbols. The control data handled by the thermal printer according to this exemplary embodiment is comprised of multi-bit pixel data. Below, the explanation takes as an example a case in which the control data comprises two-bit pixel data.

When the platemaking process shown in FIG. 10 starts, the print data is acquired in step S11 and the porous material M is conveyed to the start position in step S12. Furthermore, in step S13 electricity is passed to the thermal head 103 for the first duration of time based on one line of print data. These processes are the same as those in steps S1 through S3 of FIG. 4.

Next, the thermal printer generates one line of control data for identifying areas of the porous material M where ink readily runs and the easiness of running of ink in those areas (step S14). Here, the central control circuit 101 reads the print data of the current line and the print data of the previous and subsequent lines and generates the control data based on the print data read.

In this exemplary embodiment, the pixel data comprising the control data is two-bit data. Pixel data with a pixel value of "0" is pixel data corresponding to areas where the ink does not readily run (not-subject-to-correction pixel data). On the other hand, pixel data with a pixel value other than "0" is pixel data corresponding to areas where ink readily runs (subject-to-correction pixel data), and the pixel value is a weighting value indicating the easiness of running of the ink. For example, an area corresponding to pixel data with a pixel value of "3" indicates that ink runs three times as readily as in an area corresponding to pixel data with a pixel value of "1".

The control data generation sequence is basically the same as in the first exemplary embodiment. For example, when an area corresponding to the non-print pixel data does not exist above, below, to the left or to the right of an area corresponding to the print pixel data, that area is identified as an area in which ink readily runs with an ink easiness of running of "1" (weighting value of "1"). The ink easiness of running is preferably determined in advance in and may be not just "1" but "2" or "3".

When one line of control data is generated, the thermal printer passes electricity for a duration of time corresponding to the weighting value to the thermal head 103 based on the generated one line of control data (step S15).

More specifically, the process is accomplished through the following sequence. First, the subject-to-correction pixel data and the pixel data not subject to correct are identified from one line of control data. Next, the heater elements (second heater elements) that come into contact with areas of the porous material M corresponding to subject-to-correction pixel data when the porous material M is pressed by the thermal head 103 are identified. Finally, electricity is passed to the second heater elements identified from among the plurality of heater elements of the thermal head 103 for a duration of time in accordance with the weighting value that is the pixel value of the not-subject-to-correction pixel data, and the second heater elements are selectively caused to generate heat. The duration of time in accordance with the pixel value (weighting value) is the duration of time in accordance with the easiness of running of the ink, and is a time shorter than the first duration of time of step S13 and a time that is longer the larger the pixel value (weighting value). For example, if the pixel value is "1", the first duration of time in step S13 is ⅓, and if the pixel value is "2", the first duration of time in step S13 is ⅔.

The subsequent processes (step S16, step S17) are the same as in step S6 and step S7 of FIG. 4.

Through the thermal printer according to this exemplary embodiment, it is possible to obtain the same results as with the thermal printer 100 according to the first exemplary embodiment, and in addition, it is possible to accomplish various variations similar to the thermal printer 100 according to the first exemplary embodiment. For example, as long as the heat quantity that should be applied to each area is maintained, it would be fine to differ the number of times electricity is passed or the voltage value when passing electricity in place of causing the duration of time of passing electricity to differ in the process of passing electricity in steps S13 and S15. Furthermore, the thermal printer according to this exemplary embodiment may cause the heat quantity that should be applied to each area to be maintained through control combining multiple out of the duration of time of passing electricity, the number of times passing electricity and the voltage value when passing electricity, in the process of passing electricity in steps S13 and S15.

Second Exemplary Embodiment

Figure 11:
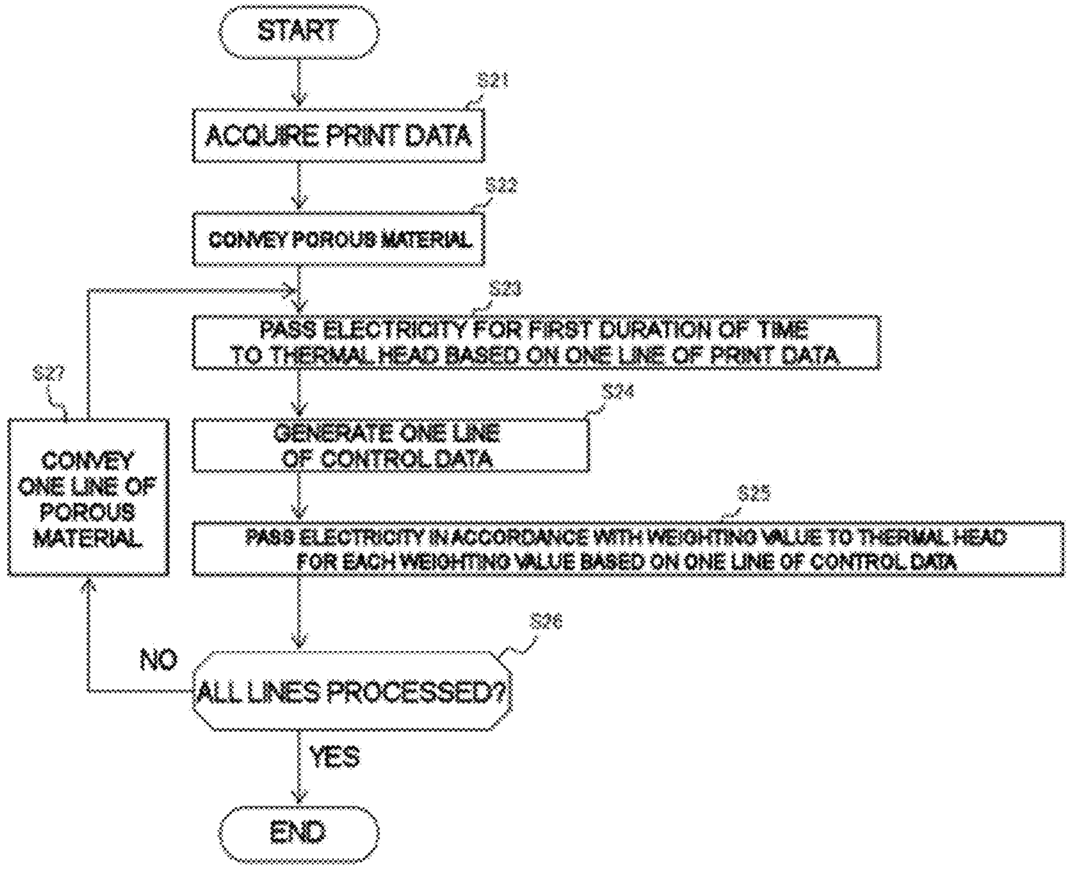
FIG. 11 is a flowchart of a platemaking process accomplished by a thermal printer according to a third exemplary embodiment of the present disclosure.
Figure 12:
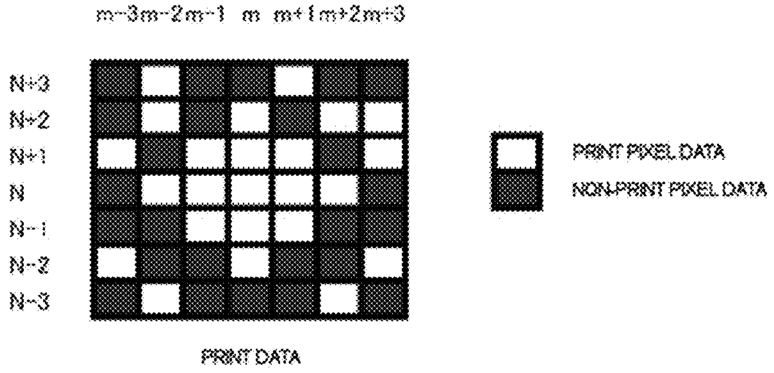
FIG. 12 is a drawing showing one example of the print data acquired from an external apparatus by the thermal printer according to the third exemplary embodiment of the present disclosure.
Figure 13:
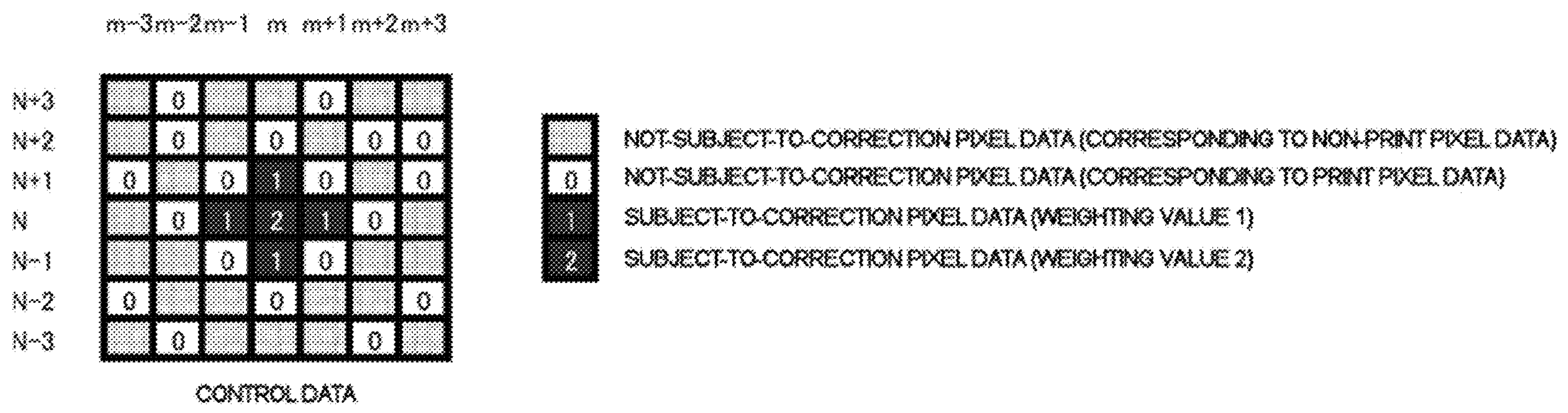
FIG. 13 is a drawing showing one example of control data generated based on the print data shown in FIG. 12 by the thermal printer according to the third exemplary embodiment of the present disclosure.

FIG. 11 is a flowchart, of the platemaking process accomplished by the thermal printer according to this exemplary embodiment. FIG. 12 is a drawing showing one example of print data acquired from an external apparatus by the thermal printer according to this exemplary embodiment. FIG. 13 is a drawing showing one example of control data generated based on the print data of FIG. 12 by the thermal printer according to this exemplary embodiment. Below, the platemaking process accomplished by the thermal printer according to this exemplary embodiment is described with reference to FIGS. 11 through 13.

The structure of the thermal printer according to this exemplary embodiment is the same as that of the thermal printer 100 according to the first exemplary embodiment. Consequently, the same constituent elements are labeled with the same reference symbols. In addition, the control data handled by the thermal printer according to this exemplary embodiment is the same as the control data handled by the thermal printer according to the second exemplary embodiment, and comprises multi-bit pixel data. Below, an example is described for a case in which the control data comprises two-bit pixel data.

When the platemaking process shown in FIG. 11 begins, in step S21 the print data is acquired and in step S22 the porous material M is conveyed to the start position. Furthermore, in step S23, electricity is passed for the first duration of time to the thermal head 103 based on one line of print data. These processes are the same as step S1 through S3 of FIG. 4.

Next, the thermal printer generates one line of control data for identifying areas of the porous material M where the ink readily runs and the easiness of running of the ink in those areas (step S24). The central control circuit 101 reads from the RAM a total of five lines of print data, namely the present line of print data and two lines each preceding and subsequent, and generates the control data based on the print data read.

In this exemplary embodiment, the pixel data comprising the control data is two-bit data. The pixel data with a pixel value of "0" is pixel data corresponding to areas where the ink does not readily run (not-subject-to-correction pixel data). On the other hand, pixel data other than that with a pixel value of "0" is pixel data corresponding to areas where the ink readily runs (subject-to-correction pixel data), and the pixel value is a weighting value indicating the easiness of running of the ink. For example, areas corresponding to pixel data with a pixel value of "3" indicate that the ink runs three times as readily as areas corresponding to pixel data with a pixel value of "1".

The control data generation sequence is described in detail with reference to FIGS. 12 and 13.

For example, when generating the Nth line of control data, first the areas corresponding to the print pixel data are identified from the Nth line of print data. Here, an area (N, m−2), an area (N, m−1), an area (N, m), an area (N, m+1) and the area (N, m+2) are identified.

Next, for each identified area corresponding to the print pixel data, whether or not areas corresponding to non-print pixel data exist in the neighborhood of that area is determined based on print data read from the RAM.

In this exemplary embodiment, first the neighboring areas are defined as areas within two pixels from an area in the up, down, left and right directions (first definition), and next the neighboring areas are defined as areas adjacent to the neighboring areas up, down, left or right (second definition).

For example, taking the area (N, m) shown in FIG. 12 as an example, with the first definition the areas respectively corresponding to an area (N, m−2), an area (N, m−1), an area (N, m+1), an area (N, m+2), an area (N−2, m) an area (N−1, m) an area (N+1, m) and an area (N+2, m) neighbor that area. In addition, with the second definition, areas corresponding to the area (N, m−1), the area (N, m+1), the area (N−1, m) and the area (N+1, m) neighbor that area.

In addition, in the respective definitions, when it is determined that areas corresponding to non-print pixel data do not exist in the neighborhood of that area, that area is identified as an area where ink readily runs. Furthermore, the easiness of running of ink in that area is identified based on the distance between that area and the area most separated from that area within the neighborhood corresponding to that area. For example, with the first definition, the identified area is identified as an area in which the ink readily runs with an easiness of running of the ink of "2" (weighting value "2") because a maximum distance is two pixels. In addition, with the second definition, the identified area is identified as an area in which the ink readily runs with an easiness of running of the ink of "1" (weighting value "1") because a maximum distance is one pixel. On the other hand, with either definition, when it is determined that an area corresponding to non-print pixel data exists in the neighborhood of that area, that area is identified as an area in which the ink does not readily run.

As a result, as shown in FIG. 13, of the areas corresponding to the Nth line of print pixel data, the area (N, m) is identified as an area in which ink readily runs with an easiness of ink running of "2", and the area (N, m−1) and the area (N, m+1) are identified as areas in which ink readily runs with an easiness of ink running of "1". In addition, the area (N, m−2) and the area (N, m+2) are identified an areas in which the ink does not readily run.

Finally, a line of control data is generated with the pixel data of areas identified as areas in which the ink readily runs taken as subject-to-correction pixel data with the easiness of ink running as the pixel value, and the pixel data of areas identified as areas where the ink does not readily run and pixel data of areas corresponding to the print data taken as not-subject-to-correction pixel data.

When one line of control data is generated, the thermal printer passes electricity for a duration of time corresponding to the weighting value to the thermal head 103 for each pixel value (weighting value) based on the generated one line of control data (step S25).

Specifically, the process is accomplished in the following sequence. First, the thermal printer identifies the subject-to-correction pixel data and the not-subject-to-correction pixel data for each weighting value from one line of control data. Next, heater elements (third heater elements) that will contact the areas of the porous material M corresponding to the subject-to-correction pixel data having a weighting value of "2" when the porous material M is pressed by the thermal head 103 are identified. Furthermore, electricity is passed to the third heater elements identified from among the plurality of heater elements of the thermal head 103 for a duration of time corresponding to the weighting value of "2", and the third heater elements are selectively caused to generate heat. Furthermore, heater elements (fourth heater elements) that will contact areas of the porous material M corresponding to subject-to-correction pixel data having a weighting value of "1" when the porous material M is pressed by the thermal head 103 are identified. Furthermore, electricity is passed to the fourth heater elements identified from among the plurality of heater elements of the thermal head 103 for a duration of time corresponding to the weighting value of "1", and the fourth heater elements are selectively caused to generate heat. The definitions of the duration of time corresponding to the pixel values (weighting values) are the same as in the second exemplary embodiment.

Through this, more pores are plugged the more readily ink runs in an area, so running of ink is curtailed.

Subsequent processes (step S26, step S27) are the same as step S6 and step S7 of FIG. 4.

Through the thermal printer according to this exemplary embodiment, it is possible to obtain the same results as with the thermal printer 100 according to the first exemplary embodiment, and in addition, it is possible to accomplish various variations the same as the thermal printer 100 according to the first exemplary embodiment. For example, as long as the heat quantity that should be applied to each area is maintained, the thermal printer according to this exemplary embodiment may cause the number of times passing electricity or the voltage value when passing electricity to differ in place of causing the duration of time of passing electricity to differ in the process of passing electricity in steps S23 and S25. Furthermore, the thermal printer according to this exemplary embodiment may cause the heat quantity that should be supplied to each area to be maintained by control through a combination of multiple out of the duration of time of passing electricity, the number of times passing electricity and the voltage value when passing electricity, in step S23 and step S25.

In addition, with the thermal printer according to this exemplary embodiment, it is possible to add heat quantity differing in accordance with the easiness of the ink running for areas in which the ink readily runs. Consequently, it is possible to manufacture a printing plate that more appropriately curtails running of the ink and sufficiently curtails differences in shading within the areas comprising the print pattern.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

For example, it would be fine to identify heater elements that will contact areas of the porous material M corresponding to subject-to-correction pixel data having a weighting value of "1" or "2" when passing electricity to the thermal head 103, while pressing the porous material M by the thermal head 103, and to cause the identified heater elements alone to selectively generate heat for a duration of time corresponding to the weighting value of "1", and to then identify heater elements that will contact areas of the porous material M corresponding to the subject-to-correction pixel data having a weighting value of "2" and to selectively cause only the identified heater elements to generate heat for the difference between the duration of time corresponding to the weighting value of "1" and the duration of time corresponding to "2".

What is claimed is:

1. A computer readable non-transitory recording medium storing a control program for controlling a manufacturing apparatus which manufactures a printing plate from a thermoplastic porous material and comprises a thermal head with a plurality of heater elements, the control program causing a computer to:

acquire print data corresponding to a print pattern and including pixel data, with each item of pixel data corresponding to each area of the surface of the porous material partitioned into a lattice shape;

identify, based on the print data, print pixel data that is part of the pixel data and is pixel data comprising the print pattern, and non-print pixel data that is the other part of the pixel data and is pixel data not comprising the print pattern;

selectively apply a first heat quantity to a first area corresponding to the non-print pixel data by at least one first heater element, among the plurality of heater elements provided on the thermal head, that makes contact with the first area; and selectively apply a second heat quantity that is smaller than the first heat quantity to a second area by at least one second heater element, among the plurality of heater elements, that makes contact with the second area identified by the control data of the print pixel data, the second area being where ink readily runs.

2. The computer-readable non-transitory recording medium storing a control program according to claim 1, wherein:

the control data identifies a third area and a fourth area other than the second area by identifying the easiness of running of ink in the second area, the third area being an area out of the second area in which the easiness of running of the ink is a first easiness of running, and the fourth area being an area out of the second area in which the easiness of running of the ink is a second easiness;

a third heat quantity corresponding with the first easiness of running is selectively applied to the third area by at least one third heater element, out of the plurality of heater elements, that makes contact with the third area; and a fourth heat quantity corresponding with the second easiness of running is selectively applied to the fourth area by at least one fourth heater element, out of the plurality of heater elements, that makes contact with the fourth area.

3. The computer-readable non-transitory recording medium storing a control program according to claim 1, wherein:

the control data identifies a third area and a fourth area in addition to the second area by identifying the easiness of running of ink in the second area, the third area being an area out of the second area in which the easiness of running of the ink is a first easiness of running, and the fourth area being an area out of the second area in which the easiness of running of the ink is a second easiness;

a third heat quantity corresponding with the first easiness of running is selectively applied to the third area and the fourth area by at least one third heater element that makes contact with the third area and at least one fourth heater element that makes contact with the fourth area, out of the plurality of heater elements; and a fourth heat quantity corresponding with the difference between the first easiness of running and the second easiness of running is selectively applied to the fourth area by at least one fourth heater element, out of the plurality of heater elements.

4. The computer-readable non-transitory recording medium storing a control program according to claim 1, wherein:

the control data is generated by determining for each targeted area corresponding to the print pixel data whether or not an area corresponding to the non-print pixel data exists in the neighborhood of the targeted area, and if not, identifying the targeted area as an area where the ink readily runs.

5. The computer-readable non-transitory recording medium storing a control program according to claim 2, wherein:

the control data is generated by determining for each targeted area corresponding to the print pixel data whether or not an area corresponding to the non-print pixel data exists in the neighborhood of the targeted area, and if not, identifying the targeted area as an area where the ink readily runs, and identifying the easiness of running of the ink based on the distance between the targeted area and an area most separated from the targeted area out of the neighborhood corresponding to the targeted area.

6. The computer-readable non-transitory recording medium storing a control program according to claim 3, wherein:

the control data is generated by determining for each targeted area corresponding to the print pixel data whether or not an area corresponding to the non-print pixel data exists in the neighborhood of the targeted area, and if not, identifying the targeted area as an area where the ink readily runs, and identifying the easiness of running of the ink based on the distance between the targeted area and an area most separated from the targeted area out of the neighborhood corresponding to the targeted area.

7. The computer-readable non-transitory recording medium storing a control program according to claim 1, wherein:

the first heat quantity is applied to the first area by passing electricity to the at least one first heater element for a first duration of time; and the second heat quantity is applied to the second area by passing electricity to the at least one second heater element for a second duration of time.

8. The computer-readable non-transitory recording medium storing a control program according to claim 2, wherein:

the third heat quantity is applied to the third area by passing electricity to the at least one third heater element for a duration of time or number of times corresponding to the first easiness of running; and the fourth heat quantity is applied to the fourth area by passing electricity to the at least one fourth heater element for a duration of time or number of times corresponding to the second easiness of running.

9. The computer-readable non-transitory recording medium storing a control program according to claim 3, wherein:

the third heat quantity is applied to the third area and the fourth area by passing electricity to the at least one third heater element and the at least one fourth heater element for a duration of time or number of times corresponding to the first easiness of running; and the fourth heat quantity is applied to the fourth area by passing electricity to the at least one fourth heater element for a duration of time or number of times corresponding to the difference between the first easiness of running and the second easiness of running.

10. The computer-readable non-transitory recording medium storing a control program according to claim 1, wherein:

the duration of time of passing electricity to each heater element is controlled so that each heater element achieves the selective application for each heat quantity applied to each area.

11. The computer-readable non-transitory recording medium storing a control program according to claim 1, wherein:

the number of times of passing electricity to each heater element is controlled so that each heater element achieves the selective application for each heat quantity applied to each area.

12. The computer-readable non-transitory recording medium storing a control program according to claim 1, wherein:

the voltage value of each heater element is controlled so that each heater element achieves the selective application for each heat quantity applied to each area.

13. The computer-readable non-transitory recording medium storing a control program according to claim 1, wherein:

the voltage value of each heater element and the duration of time of passing electricity to each heater element are controlled so that each heater element achieves the selective application for each heat quantity applied to each area.

14. The computer-readable non-transitory recording medium storing a control program according to claim 1, wherein:

the voltage value of each heater element, the duration of time and the number of times of passing electricity to each heater element are controlled so that each heater element achieves the selective application for each heat quantity applied to each area.

15. An apparatus for manufacturing a printing plate from a thermoplastic porous material, the apparatus comprising:

a thermal head with a plurality of heater elements; and a controller for controlling the thermal head;

wherein the controller includes:

a data acquirer for acquiring print data corresponding to a print pattern and including pixel data, with each item of pixel data corresponding to each area of the surface of the porous material partitioned into a lattice shape;

a data identifier for identifying, based on the print data, print pixel data that is part of the pixel data and is pixel data comprising the print pattern, and non-print pixel data that is the other part of the pixel data and is pixel data not comprising the print pattern;

a first heat applier for selectively applying a first heat quantity to a first area corresponding to the non-print pixel data by at least one first heater element, among the plurality of heater elements, that makes contact with the first area; and a second heat applier for selectively applying a second heat quantity that is smaller than the first heat quantity to a second area by at least one second heater element, among the plurality of heater elements, that makes contact with the second area identified by the control data of the print pixel data, the second area being where ink readily runs.

* * * * *